Figure 3:
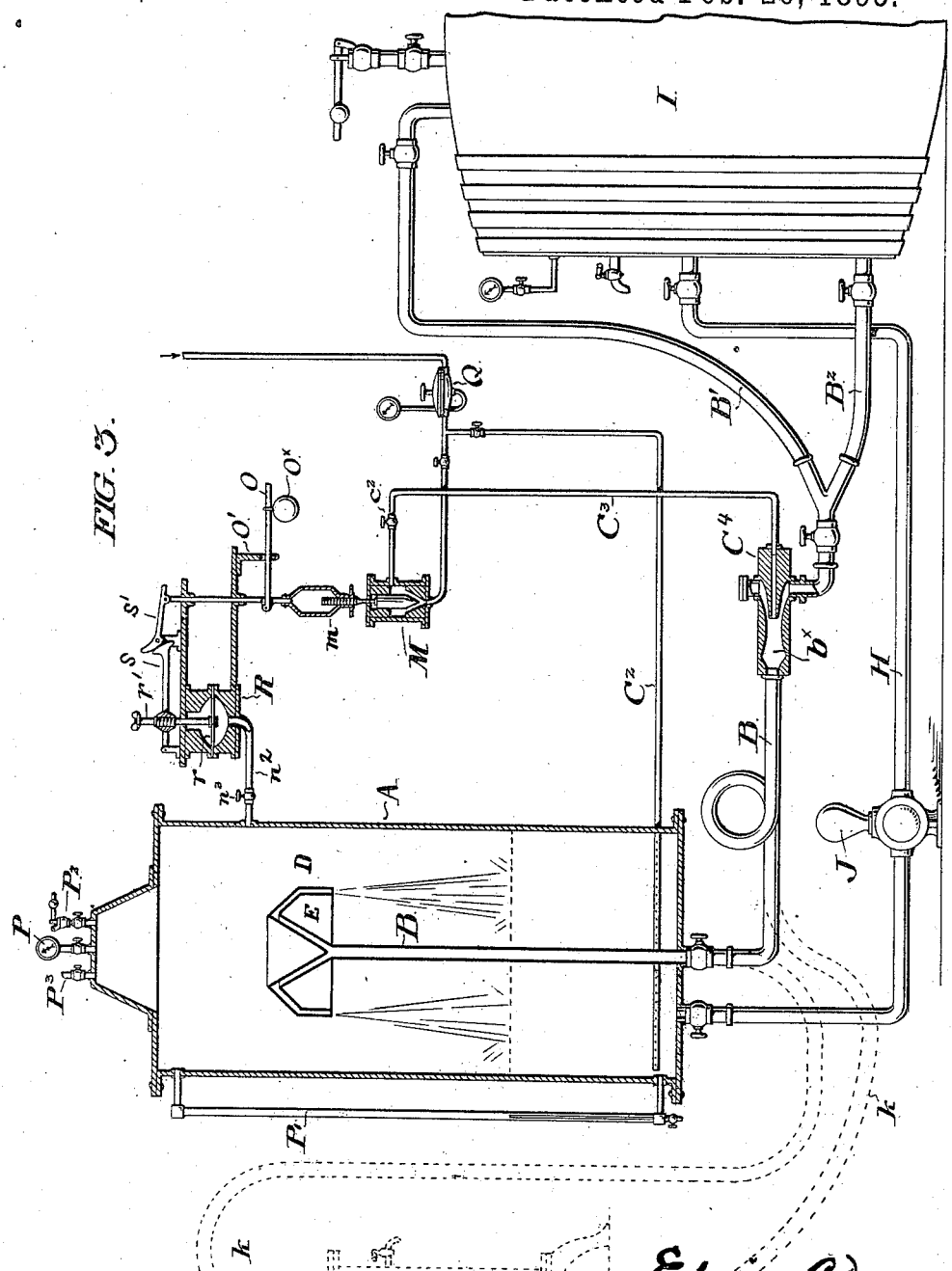

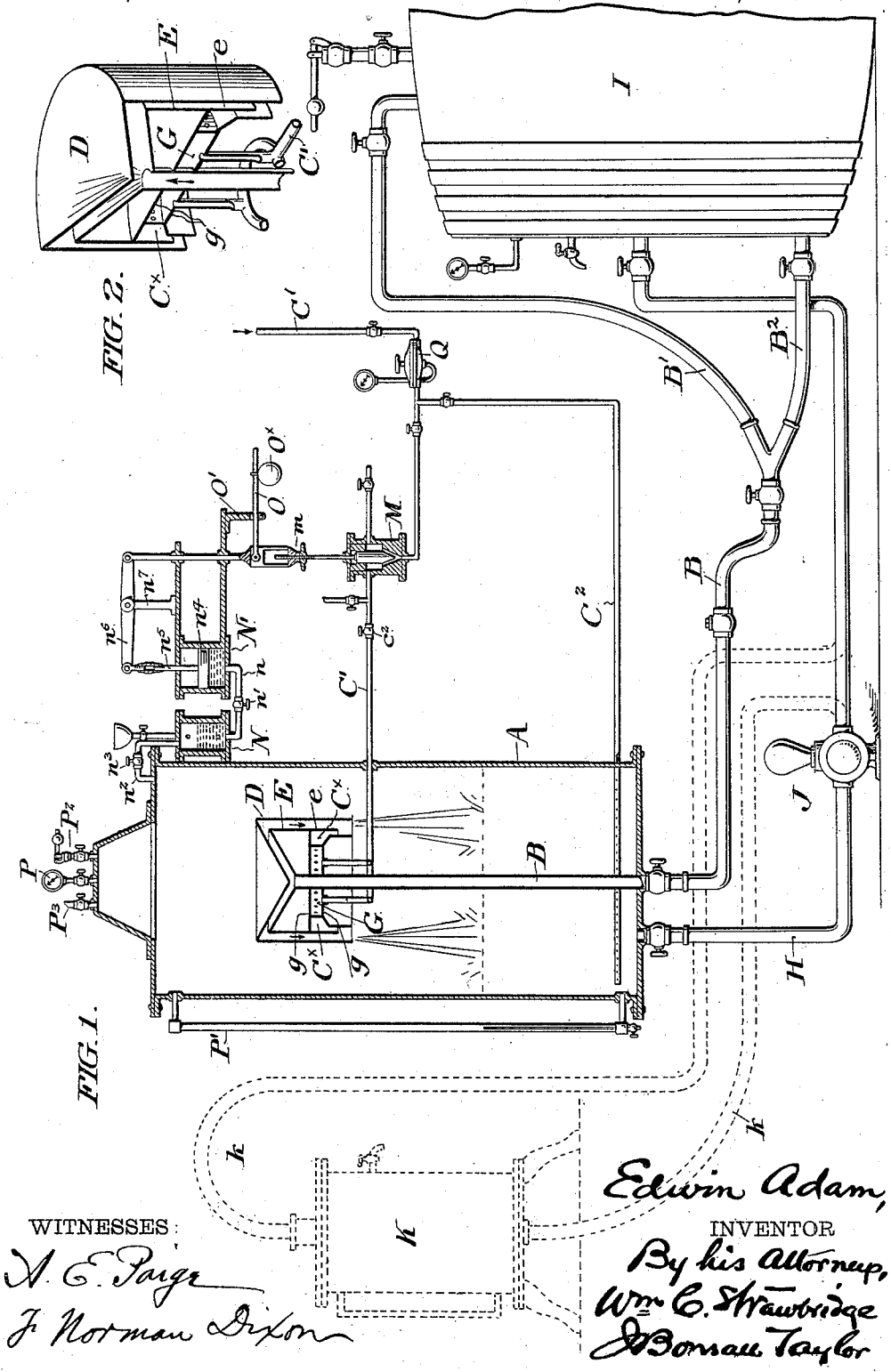

(No Model.) 2 Sheets—Sheet 2.
E. ADAM.
PROCESS OF AND APPARATUS FOR CARBONATING LIQUIDS.
No. 534,848. Patented Feb. 26, 1895.

WITNESSES:
N. E. Paige
J. Norman Dixon

INVENTOR
Edwin Adam,
By his Attorneys,
Wm. C. Strawbridge
J. Bonsall Taylor

UNITED STATES PATENT OFFICE.

EDWIN ADAM, OF PHILADELPHIA, PENNSYLVANIA.

PROCESS OF AND APPARATUS FOR CARBONATING LIQUIDS.

SPECIFICATION forming part of Letters Patent No. 534,848, dated February 26, 1895.

Application filed February 24, 1894. Serial No. 501,320. (No model.)

*To all whom it may concern:*

Be it known that I, EDWIN ADAM, a citizen of the United States, residing in the city and county of Philadelphia, in the State of Pennsylvania, have invented certain new and useful Improvements in Processes of and Apparatus for Carbonizing Liquids, of which the following is a specification.

In order that it may possess the required flavor and life, it is well known that beer must contain a given quantity or proportion of carbonic acid gas. Although in the ordinary course of the manufacture of beer, a certain amount of this gas is generated in the process of fermentation to which the immature beer is subjected, yet the gas so generated is insufficient in quantity to produce the required effect, and the additional gas required has been supplied by resort either to the well known kraeusen process, or to the expedient of artificially carbonizing the "ruh" beer by the direct injection of carbonic acid gas. The second of these expedients is the more expeditious and for several reasons the more desirable of the two. In practice, however, difficulty has been experienced in so thoroughly and effectually combining with the beer the gas artificially charged to it as to produce a uniform product.

It is the object of my invention to provide a simple, novel and efficient process of and apparatus for charging beer or other liquid with carbonic acid gas,—in the practice of which process and in the operation of which apparatus the commingling of the beer and the gas will be so thoroughly and evenly accomplished that the charged beer will be produced as a uniform product both as to the incorporation of the gas within and throughout the body of the liquid and as to the proportion which the quantity of gas will bear to the body of the liquid.

In the accompanying drawings I show a good form of apparatus conveniently embodying my invention in so far as the same is concerned with apparatus, and herein I describe the said apparatus and my improved process as carried on in connection therewith, the particular subject matter claimed as novel being hereinafter definitely specified.

In the drawings, Figure 1 is a central vertical sectional elevation of my improved apparatus. Fig. 2 is a sectional view in perspective of my improved form of charging apparatus. Fig. 3 is a central vertical sectional elevation of the form of my apparatus, which constitutes, in so far as the charging of the gas into the liquid pipe at a point exterior to the equalizing tank is concerned, the preferred embodiment of my invention.

Similar letters of reference indicate corresponding parts.

In the accompanying drawings, see Figs. 1 and 2, A is an equalizing vessel, being, except for inlet and outlet pipes, a tank hermetically closed.

B is a liquid inlet pipe in communication with any suitable source of liquid supply, and $C'$ is a gas inlet pipe in communication with any suitable source of gas supply. Both the liquid and the gas inlet pipes enter and terminate at a point in proximity to the top of the equalizing tank and serve as a support for the charging apparatus the construction of which is shown in detail in Fig. 2.

The charging apparatus consists of a pair of plates D E slightly separated so as to form between them a small interspace into which the liquid pipe discharges and from which the liquid descends to the lower portion of the tank. These plates are so related as to serve to transform the liquid delivered between them, into the form of a thin sheet, in which form it issues from between them;—and one of them is as to that face which is in contact with the sheet of liquid, formed or provided with a pocket or recess which I term the gas pocket $C^x$, into which the gas pipe $C'$ directly or indirectly discharges, in order that said thin sheet of liquid, in descending, may pass across the mouth of said gas pocket with the result hereinafter set forth.

In practice, I prefer to so form the shells or plates D E that the sheet of liquid and the gas pocket are both annular, with the result that the maximum economy of space is secured.

In the construction shown, the liquid inlet pipe B enters through the bottom of the equalizing tank, and the portion which exists within said tank is vertically arranged with relation thereto.

The inner shell E of the charging device comprises a circular horizontally-disposed diaphragm which surrounds and extends outwardly from the mouth of the pipe B and a wall which depends from the rim of said diaphragm and is intermediate of its height formed or provided with the annular channel hereinbefore referred to as constituting the gas pocket $C^\times$.

The outer shell D of the charging device comprises a circular horizontally-disposed diaphragm suitably supported a slight distance above and of somewhat greater diameter than the diaphragm of the shell E, and an annular wall which depends from the rim of said diaphragm.

The horizontal diaphragms are preferably arranged, when the liquid-pipe discharges upwardly as shown in the drawings, as downwardly inclined from circumference to center so as to be of conical form cross-sectionally, as shown.

$g\ g$ are a pair of horizontally disposed plates situated within the interior space of the inner shell, one at or above the upper edge of the pocket and the other at or below the lower edge of the pocket, and both hermetically connected on all sides to the wall of said shell to form a gas chamber G.

The gas chamber G is in communication with the gas pocket $C^\times$ through any suitable openings or opening. In the drawings I show the plate which forms the base or inner side of the gas pocket as provided with a series of openings disposed in equi-distant relationship.

A continuous slot or openings of any desired character may of course be substituted for the openings shown.

$e$ is a flange depending from the upper edge or lip of the gas pocket, and preferably of such breadth as to extend below the openings in the base of said pocket. The annular space between the lower edge of this flange and the body of the inner shell I term the mouth of the gas pocket, across or past which the sheet of liquid flows and through which the gas flows to join the liquid.

The gas pipe $C'$ hereinbefore mentioned as entering the equalizing chamber, discharges into the gas chamber G, being preferably provided with two small branches which enter said gas chamber at opposite sides of the latter, and thereby serve to secure the equal distribution and pressure of the gas therein.

$C^2$ is a second gas pipe, in communication with a suitable source of supply, conveniently formed as a branch of the pipe $C'$ and extending through the lower portion of the equalizing tank. This pipe is within the tank provided with a series of small perforations so as to be adapted to deliver gas in a number of small jets equally distributed across the breadth of the tank.

H is a liquid outlet pipe through which the charged liquid is conducted from the equalizing tank.

In the drawings the liquid supply pipe B is shown as in communication with and leading from,—and the outlet pipe H as discharging into,—one and the same cask or receptacle I, and J is a pump in circuit with the pipe H and serving to draw liquid from the equalizing tank and force it into the receptacle I. The result of this arrangement is, the receptacle I being always full of liquid, that the pump pressure operates to force liquid out of the said receptacle I through the pipes $B'\ B^2$ B, and into the equalizing tank, where a surplus of liquid always remains, in addition to the liquid contained in the receptacle I, upon which surplus the pump constantly draws. By virtue of this arrangement the receptacle I is kept constantly full of the liquid with the result that the gas charged to the liquid has no opportunity to become separated therein from the liquid as is apt to be the case where a charged liquid is caused to enter a receptacle but partly filled. Incidentally, the outer portion of the pipe B is formed into two branches $B'$ and $B^2$, one of which taps or is connected with the upper and the other of which taps or is connected with the lower portion of said receptacle I, so that when the contents of the said receptacle are caused to issue to pass to the equalizing tank, the liquid from both the upper and lower portions of the receptacle pass out together.

K is a filter of any usual or preferred construction, connected through the pipes $k\ k$ with one of the pipes B or H, so that all liquid passing through said pipes will incidentally be passed through the filter.

By preference the inner extremities of the filter pipes $k\ k$ connect with the pipe H at points between the force pump and the receptacle I.

The discharge end of the outlet pipe H preferably enters the receptacle I at a point midway of the height of the latter.

M is a valve mounted upon the gas inlet pipe $C'$, adapted to control the flow of gas through said pipe, and automatically regulated by the gas pressure within the equalizing vessel by the following contrivances.

$N\ N'$ are a pair of cylinders suitably supported side by side in any convenient manner in any preferred position, in communication with each other through a pipe $n$ which connects to their respective bottoms, and is controlled by a cock $n'$. A quantity of liquid which tends to maintain itself at a common level in both cylinders, is contained therein.

The cylinder N is in communication by a pipe $n^2$ controlled by a cock $n^3$ with the interior of the equalizing vessel; and the cylinder $N'$ is provided with a piston head $n^4$ which floats upon the surface of the liquid in said cylinder, the stem $n^5$ of which is (conveniently through an intermediary balance bar $n^6$ mounted upon and pivoted with respect to a standard $n^7$) connected to the valve stem $m$ of the valve M.

The valve stem $m$ is conveniently formed of two parts connected together in threaded relationship so as to be capable of being lengthened or shortened to take up wear or compensate for variations of temperature,— and is provided with a weight or scale arm O pivotally connected to it, and also pivotally connected intermediate of its length with respect to a rigid bracket arm O'. Upon the outer end of the weight or scale arm, a weight $O^\times$ is mounted.

The equalizing tank is provided with a pressure gage P, liquid gage P', safety valve $P^2$, and air outlet $P^3$, and the several pipes B, C', $C^2$, and H, are all equipped with the usual manually operated cocks, the gas pipe C' being also equipped with the usual reducing valve Q.

The operation of my apparatus will be readily understood.

The parts being supposed assembled and connected in the manner illustrated in the drawings, the valve $n^3$ in the pipe $n^2$, and the valves in the gas pipes being closed, and the valve in the air outlet $P^3$ being open,—the liquid inlet pipe B, the outlet pipe H and its connected filter and filter pipes $k$ $k$ are filled, and the equalizing tank half or partly filled with the liquid to be operated upon. By the opening of a valve which controls the branch gas inlet pipe $C^2$, the gas is permitted to enter the equalizing tank, with the result that said gas expels through the outlet $P^3$ and replaces the air originally contained within said equalizing tank. The cock which controls the outlet $P^3$, and the cock which controls the branch $C^2$, are thereupon closed, the cocks $n^3$ and $c^2$, opened, and the pump started, with the result that in the continued operation of the apparatus liquid from the receptacle I, which is preferably filled substantially to its capacity, will be continuously delivered to the equalizing tank through the pipe B, and gas continuously delivered at any desired pressure through the pipe C', while the liquid will be contemporaneously withdrawn from said equalizing tank and delivered to the receptacle I.

It is to be understood that the liquid in place within the equalizing tank and the pipes B H and $k$, is additional to that contained in the tank I, which tank is, when the pump is started, as well as continuously thereafter, filled substantially to its capacity, with the result that the drawing of the liquid by the pump from the tank A will result in the flowing of the liquid from said tank I to said tank A, and therefore, so long as the pump continues in operation the continuous circulation of said liquid.

As will be further understood, the liquid discharged by the pipe B between the shells of the charging apparatus is in said apparatus transformed into a thin sheet of liquid in which form it escapes therefrom, and descends to the lower portion of the equalizing tank,—and said charging apparatus being, for greater economy of space as explained, of a general annular or cylinder form, the thin sheet of liquid escaping from it is similarly of an annular form in plan.

One shell of the charging apparatus, as explained, embodies a pocket the mouth of which presents to the descending thin sheet of liquid, and as said thin sheet of liquid continuously sweeps across said mouth, it carries away with it from the pocket gas in a continuous stream, a result arising partly by reason of the suction induced by the flowing of the liquid past the mouth of the gas pocket, partly because of the natural law by which a moving stream of liquid tends to carry with it a volume of whatever surrounding fluid, air or gas, it may flow through,—and partly because the gas within the pocket, being under pressure and having no other outlet, tends to force its way into the space between the shells, and finding it more easy to travel with than against the stream of liquid existing therein, mingles and descends with the liquid between the opposing faces of the lower portions of the shell.

As a result of the tenuity of the sheet of liquid,—of the large extent of the pocket of gas across which some part of the thin sheet is constantly traveling,—of the influences which occasion the entrance of the gas into the liquid,—and of the fact that said liquid and gas when combined travel together through a narrow space between the lower portions of the shells of the charging apparatus before they emerge therefrom,—the liquid and gas are very thoroughly intermingled by the time they emerge from said charging apparatus.

The space in the equalizing tank not occupied by the liquid is, as explained, full of gas, and the charged liquid after emergence from the charging apparatus descends freely through an atmosphere of gas and joins the body of the liquid in the bottom of the tank.

In the operation of the apparatus, the speed or volume of the entering stream of gas and also the speed or volume of the entering stream of liquid, are, from a variety of causes, apt to so vary that disproportion between the amounts of gas and liquid meeting in the charging apparatus will occur, with the result, if uncorrected, of occasioning lack of uniformity in the charged product. Any such disproportion is, however, corrected and uniformity insured in the following manner:— Gas at or about any selected pressure always exists within the equalizing tank and constantly acts upon the liquid within the cylinder N with a tendency to depress it and to occasion a corresponding elevation of the liquid in the cylinder N' and of the piston head $n^4$ and piston rod $n^5$ within said cylinder, the tilting of the balance bar $n^6$, and the depression of the valve stem $m$ and the valve M.

A regulated resistance to the tendency of the gas pressure within the tank A to close the valve M, is afforded by the weight $O^\times$, which is normally so set that, when the desired pressure exists within the tank A, the valve M will be open, but so soon as the pressure within said tank gradually rises above the selected limit, said pressure will overcome the resistance of the weight $O^\times$ and gradually close the valve M.

When the flow of the gas to the charging apparatus is so swift as to be out of proportion to the flow of liquid thereto, a certain amount of the gas will not be absorbed by or incorporated with the liquid, and, in the descent of the liquid from the charging apparatus through the body of gas within the tank A, this free or uncombined gas which represents the excess of gas supplied to the liquid, will be released from the liquid, and, joining the volume of gas within the tank A, will raise the gas pressure therein. The augmented gas pressure within the tank will thereupon immediately act upon the devices which control the valve M, and effect a closure of the valve proportioned to the excess of the gas pressure. An immediate reduction in the supply of gas to the charging apparatus will, of course, follow, with the result that, said supply being insufficient to adequately charge the liquid flowing into the charging device, the insufficiently charged liquid will in descending through the body of gas under the augmented pressure within the tank, by absorbing more or less of said gas, complete the charging operation left incomplete by reason of the deficient supply of gas into the charging apparatus, and reduce the gas pressure within said tank, with the further result that as said gas pressure is gradually reduced to the predetermined degree or limit, the weight $O^\times$ will act to graually open the valve M.

From a consideration of the operation just described it will be understood that gas flowing to the charging device in excess of the capacity of the liquid supplied to the charging device to absorb, will raise the gas pressure within the equalizing tank, and, through the valve-controlling devices partly or wholly shut off the gas supply,—while, when the gas supply is partly or wholly closed, the excess of the liquid supply over the gas supplied through the gas inlet pipe C' and not completely charged, will absorb the excess of gas within the tank, and occasion the consequent reduction of the gas pressure within said tank and the increase or restoration of the gas supply through the gas inlet pipe C'. Upon the other hand, it will be equally apparent, that where the supply of gas entering the charging apparatus is insufficient to charge the liquid supplied thereto,—the liquid descending through the body of gas within the tank will absorb the required quantity and diminish the volume of such gas, and that, the pressure of gas bearing upon the valve controlling devices being thus diminished, the weight $O^\times$ will act to further open the valve M and increase the flow of gas through the inlet pipe C'. The gas supply to the charging apparatus may therefore be said to be automatically regulated by the gas-absorbing capacity of the liquid itself.

The form of apparatus depicted in Fig. 3 of the drawings, while similar in general construction and arrangement to the apparatus of Fig. 1, differs from said apparatus in that a different form of valve-controlling mechanism is employed,—in that the plates which form the liquid into sheet form are of a different profile or outline in cross-section,—in that the gas is introduced to, or brought into the presence of, the liquid at a point exterior to the equalizing tank instead of at a point within said tank and between the plates D E, and, finally, in that the filter pipes $k\ k$ are connected to the pipe B instead of to the pipe H, as in said construction of Fig. 1.

Referring to the valve-controlling mechanism of said Fig. 3, $n^2$ is the pipe hereinbefore referred to as leading out from the tank A, and R is a valve casing into the hollow interior of which said pipe $n^2$ leads. $r$ is a diaphragm extending across and dividing into two compartments the chamber of said valve casing, and provided with an upwardly extending follower $r'$ the upper portion of which is, exterior to the valve casing, engaged in threaded relationship with respect to one arm, $s$, of a compound lever, the other arm, $s'$, of which is engaged with the valve stem $m$ of the valve M which controls the gas pipe $C^3$. The lever arms $s\ s'$ are mounted and supported in appropriate relationship, and are so arranged that their meeting extremities instead of being united by hinges links or other positive connections, are provided with contacting faces possessing opposite inclinations and acting upon and against each other after the manner of inclined planes to occasion opposite movements of said arms. The plates D E which, as described, transform the liquid received between them into sheet form, are, in cross-section, of somewhat different shape than, although preserving the same general arrangement as, the plates D E of the construction shown in Fig. 1,—said plates, in Fig. 3, being shown as of an approximate M-shape in cross-section. Similarly, however, to the plates or shells of Fig. 1, said plates or shells of Fig. 3 serve to transform the liquid into sheet form, of annular plan. In the apparatus of Fig. 3, the gas supply-pipe designated $C^3$, leads to and discharges into the pipe B,—being for such purpose provided with a nozzle $C^4$ which is entered through an elbow of said pipe B in such manner as to discharge in the direction of the movement of the stream of liquid within said pipe B, and axially with respect to said stream. The bore of said pipe B embodies a slight enlargement $b^\times$ just in advance of the nozzle, which enlargement serves as a mixing chamber for the liquid and gas.

As will be apparent, in both of the forms of apparatus described, the gas is charged to the liquid in advance of the emergence of the liquid from between the plates D and E and into the gas-filled space of the equalizing tank,—being charged in the one case to the liquid while the latter is in sheet form between the plates and in the other to the liquid while in transit from its source to the plates D E.

It is of advantage to charge the gas into the liquid within the pipe leading to the equalizing tank, as shown in Fig. 3, inasmuch as in said arrangement the gas and liquid, traveling together through said pipe, will to a considerable extent become combined, before they reach the equalizing tank, and the operation of the apparatus as a whole be the more thorough. The distance to be traveled by the liquid and gas together through the pipe B may of course be increased as desired by increasing the length of the said pipe B.

Having thus described my invention, I claim—

1. The herein described process of uniformly charging liquids, which consists in continuously conducting liquid and gas into the presence of each other, introducing them together and uninterruptedly through a common mouth or inlet to the upper portion of a closed tank containing gas automatically maintained at a uniform pressure by the operation of said gas against a pressure operated device in communication with the interior of said tank and connected with a valve upon the gas supply pipe, allowing the liquid to descend freely and in tenuous form through the gas space, and contemporaneously flowing off liquid from the lower portion of said closed tank, as specified.

2. In an apparatus for carbonizing liquids, in combination, a tank, a liquid inlet, a gas inlet controlled by a valve, a movable device adapted to be moved to various adjustments by the gas pressure within the tank, and devices of fixed weight connective of said movable device and the valve which controls the gas inlet, substantially as set forth.

3. In an apparatus for carbonizing liquids, in combination, a tank, a liquid inlet, a gas inlet, a valve which controls said gas inlet, valve-controlling mechanism consisting of a device mounted in connection with the tank and adapted to be moved by variations of the gas pressure therein, devices of fixed weight and independent of the liquid level within the tank connective of said valve controlling mechanism and the valve upon the gas inlet, and means for maintaining said valve normally open, substantially as set forth.

4. In an apparatus for carbonizing liquids, in combination, a tank, means for supplying gas to said tank, a liquid inlet pipe, and a pair of plates or shells supported in proximity to the mouth of the inlet pipe, and adapted to receive between them the discharge from said pipe,—substantially as set forth.

5. A charging apparatus consisting of a pair of shells nested together and each comprising a diaphragm and a wall, a liquid pipe the mouth of which opens within the space between said shells, a recess or opening formed in the wall of one of said shells, and a gas pipe in communication with said recess or opening,—substantially as set forth.

6. A charging apparatus consisting of a pair of shells nested together, a liquid pipe the mouth of which opens within the space between said shells, a recess formed in the wall of the inner of said shells, and opening in the base of said recess, a pair of plates extending across the interior of said shell respectively above and below said opening, and a gas pipe in communication with the space between said plates,—substantially as set forth.

7. A charging apparatus consisting of a pair of shells nested together, a liquid pipe the mouth of which opens within the space between said shells, a recess formed in the wall of the inner of said shells, a series of openings in the base of said recess, a pair of plates extending across the interior of said shell respectively above and below said openings, a gas pipe in communication with the space between said plates, and a band existing in front of the series of openings formed in the base of the recess, substantially as set forth.

8. In the charging of liquids, in connection with an apparatus embodying an equalizing tank, a pipe leading to said tank, a pipe leading from said tank, and a receptacle in communication with both pipes, the improvement in the art which consists in keeping the receptacle full of liquid and providing a surplus of liquid in the equalizing tank, and in circulating said liquid by constantly drawing it from the tank and forcing it into the receptacle with the result of forcing liquid from said receptacle back to the tank, as set forth.

9. The herein described improvement in the art of charging liquid with carbonic acid gas, which consists in charging the gas into a stream of liquid,—conducting said gas and liquid together to and discharging them within the gas-filled upper portion of an equalizing tank,—allowing the liquid to descend through the upper portion of said tank, whereby the surplus or uncombined gas entering the tank with the liquid is freed from said liquid and joins the body of gas within the tank and alters its pressure,—and permitting the gas within the said tank to operate against a pressure-operated device connected with a valve upon the gas supply pipe,—with the result that the surplus gas charged into the liquid but not combined with it operates to regulate the flow of gas through the gas pipe, as specified.

In testimony that I claim the foregoing as my invention I have hereunto signed my name this 8th day of February, 1894.

EDWIN ADAM.

In presence of—
J. BONSALL TAYLOR,
WM. C. STRAWBRIDGE.